United States Patent
Ramesh et al.

(10) Patent No.: US 6,391,438 B1
(45) Date of Patent: May 21, 2002

(54) POLYOLEFIN FOAM/FILM COMPOSITE STRUCTURE AND METHOD FOR MAKING SAME

(75) Inventors: Natarajan S. Ramesh, Danbury, CT (US); Lloyd George, Barnstable, MA (US)

(73) Assignee: Sealed Air Corporation, Saddle Brook, NJ (US)

( * ) Notice: Subject to any disclaimer, the term of this patent is extended or adjusted under 35 U.S.C. 154(b) by 0 days.

(21) Appl. No.: 09/378,096

(22) Filed: Aug. 20, 1999

(51) Int. Cl.$^7$ ............ B32B 27/32; B32B 5/18; C08L 23/04
(52) U.S. Cl. ............ 428/319.7; 428/319.9; 428/319.3; 428/304.4; 428/316.6; 428/218; 428/159; 428/36.5; 428/220; 156/77; 156/78
(58) Field of Search ............ 428/304.4, 316.6, 428/218, 159, 36.5, 220, 319.9, 319.7, 319.3; 156/77, 78

(56) References Cited

U.S. PATENT DOCUMENTS

| | | | |
|---|---|---|---|
| 3,616,020 A | 10/1971 | Whelan et al. | 156/244 |
| 4,244,900 A | 1/1981 | Heider | 264/46.1 |
| 4,339,551 A | 7/1982 | Heider | 521/138 |
| 4,421,867 A | 12/1983 | Nojiri et al. | 521/82 |
| 4,626,455 A | 12/1986 | Karabedian | 428/35 |
| 4,661,401 A | 4/1987 | Akao | 428/215 |
| 4,911,978 A | 3/1990 | Tsubone et al. | 428/317.9 |
| 4,975,313 A | 12/1990 | Ezawa et al. | 428/213 |
| 5,221,395 A | 6/1993 | Luetkens, Jr. et al. | 156/244.11 |
| 5,322,724 A | 6/1994 | Levens | 428/57 |
| 5,576,080 A | * 11/1996 | Sugimoto et al. | 428/36.5 |
| 5,609,703 A | 3/1997 | Hamada et al. | 156/79 |
| 5,763,501 A | 6/1998 | Bickhardt et al. | 521/142 |
| 5,891,943 A | * 4/1999 | Katsumata et al. | 524/310 |

FOREIGN PATENT DOCUMENTS

| | | |
|---|---|---|
| JP | 1217049 | 8/1989 |
| JP | 1252645 | 10/1989 |
| JP | 8156153 | 6/1996 |
| JP | 9156053 | 6/1997 |

* cited by examiner

Primary Examiner—Blaine Copenheaver
Assistant Examiner—Hai Vo
(74) Attorney, Agent, or Firm—Thomas C. Lagaly

(57) ABSTRACT

A composite structure generally includes a polyolefin foam sheet and a film in adherence with the foam sheet. The film includes a blend of polyethylene and a thermoplastic elastomer. The elastomer includes a copolymer or terpolymer having a styrenic component and a rubbery component, the rubbery component having at least one carbon-carbon double bond. The rubbery component makes up at least about 70 wt. % of the thermoplastic elastomer. The resultant composite structure has a coefficient of friction ranging from about 0.5 to about 2.0, as measured at the upper surface of the film.

23 Claims, 2 Drawing Sheets

POLYOLEFIN FOAM/FILM COMPOSITE STRUCTURE AND METHOD FOR MAKING SAME

BACKGROUND OF THE INVENTION

The present invention relates generally to polyolefin foams and, more particularly, to extruded polyethylene foam sheets having an elastomer-containing film adhered thereto.

Polyolefin foams, particularly polyethylene foams, and methods for manufacturing such foams are well known in the art. See, e.g., U.S. Pat. No. 5,348,984 (Lee), U.S. Pat. No. 5,462,974 (Lee), and U.S. Pat. No. 5,667,728 (Lee), the disclosures of which are incorporated herein by reference thereto. One of the most common polyethylenes used is low density polyethylene (LDPE).

Polyethylene (PE) possesses a number of characteristic physical and chemical properties when used to produce a foamed sheet. Of present interest is the coefficient of friction (COF) of the surface of PE foam sheet, which generally is relatively low. While this property is generally desirable for certain applications, e.g., wave-boards (also known as bodyboards), kick-boards, and other watersport articles, in other applications, the low COF of PE foam is disadvantageous. A particular such application wherein a higher COF would be desired is the use of PE foam for a tool box liner, i.e., a cushion upon which tools may be placed in a tool box to protect both the tools and the tool box, and also to decrease the noise generated when the tool box is moved or otherwise handled. Tool boxes often have individual drawers that are pulled out to provide access to a desired tool. Such movement places a lateral force on the tools at the point at which the tools rest on the surface of the base of the drawer. Absent sufficient frictional force between the tools and the drawer, the tools have a tendency to slide relative to the drawer surface towards the rear of the drawer, thereby accumulating in a disorderly jumble at the rear of the drawer. As can be appreciated, this situation makes it more difficult to locate the intended tool than if the tools were neatly arrayed on the base of the drawer. Similar tool movement can also occur during movement or other handling of the tool box.

Notwithstanding PE foam's inherently low COF, it is advantageously used as a liner that is disposed at the base of drawers or other flat surfaces within tool boxes, due to its excellent cushioning and sound-dampening capabilities. Such properties provide both noise-reduction and protection to the tools and tool box during movement of the tool box and its component parts, e.g., opening of drawers. The cushioning provided by PE foam tool box liners also protects the tools and tool box as tool users often return their tools to the box during a project by tossing the tools into the tool box. In addition, the closed-cell construction of PE foam is such that dirt, oil, etc. is prevented from penetrating the PE foam liner, and thereby keeps the box and its components from accumulating dirt and oil. Instead, dirty liners are periodically replaced, which is much more convenient than cleaning the box.

However, due to the inherently low COF of PE foam, conventional PE foam leaves much to be desired as a tool box liner, since it allows tools to move around within the tool box as described above instead of holding the tools in place during movement of the box or its component drawers.

Another application in which a higher COF would be desired for PE foam is the use of a non-skid PE foam placed on airplane wings to facilitate servicing of the aircraft. This would protect the wing surface of the aircraft as maintenance personnel walk thereon while minimizing the risk to the maintenance workers of slipping and falling from the wing.

Other applications for PE foam wherein a higher COF would be desirable include the use of PE foam for the packaging of articles to protect them during shipment. For many articles, e.g., interior and exterior automotive parts, a higher COF would help to keep the foam properly in place in relation to the packaged article by increasing the cling or grip between the foam and the article.

Accordingly, a need exists in the art for a PE foam that provides the same cushioning and sound-dampening performance as conventional PE foam, but which has a higher COF in order to allow objects disposed on the foam to remain in place during movement of the foam.

SUMMARY OF THE INVENTION

That need is met by the present invention, which provides a composite structure comprising:
  a. a foam sheet comprising polyolefin; and
  b. a film having an upper surface and a lower surface in adherence with a surface of the foam sheet, the film comprising a blend of polyethylene homopolymer or copolymer and a thermoplastic elastomer, the thermoplastic elastomer comprising a copolymer or terpolymer comprising a styrenic component and a rubbery component, the rubbery component having at least one carbon-carbon double bond and comprising at least about 70 wt. % of the thermoplastic elastomer,
     whereby, the film in adherence with the foam sheet results in a coefficient of friction ranging from about 0.5 to about 2.0 as measured at the upper surface of the film.

In accordance with another aspect of the invention, a method for making a composite structure comprises:
  a. providing a foam sheet comprising polyolefin; and
  b. adhering a film having an upper surface and a lower surface to a surface of the foam sheet, the lower surface of the film being in adherence with the foam sheet, the film comprising a blend of polyethylene homopolymer or copolymer and a thermoplastic elastomer, the thermoplastic elastomer comprising a copolymer or terpolymer comprising a styrenic component and a rubbery component, the rubbery component having at least one carbon-carbon double bond and comprising at least about 70 wt. % of the thermoplastic elastomer,
     whereby, the film in adherence with the foam sheet results in a coefficient of friction ranging from about 0.5 to about 2.0 as measured at the upper surface of the film.

The COF range of 0.5 to 2 provided by the composite structure in accordance with the present invention is an increase over that of polyethylene foam alone, and has been found sufficient to maintain tools in place in tool boxes when used as a liner therefor, reduce or eliminate slipping when used as a non-skid foam for, e.g., aircraft maintenance, and keep the composite structure in place on a packaged article when used as a protective packaging wrap. At the same time, the excellent cushioning characteristics of PE foam are retained, so that the tools and tool box, aircraft wing surface, and package articles are protected.

DETAILED DESCRIPTION OF THE INVENTION

Figure 1:
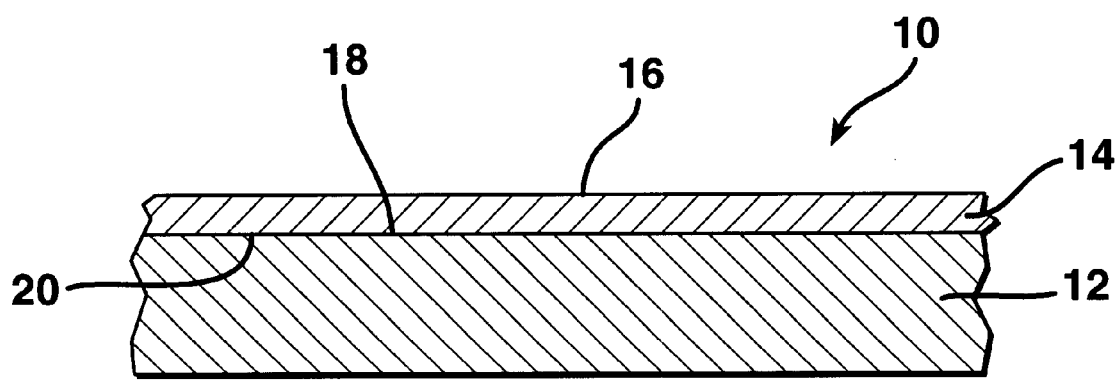
FIG. 1 is an elevational, cross-sectional view of a composite structure in accordance with the present invention.

FIG. 1 illustrates a preferred composite structure 10 in accordance with the present invention, including a foam sheet 12 and a film 14 in adherence therewith.

The foam sheet 12 in accordance with the invention comprises a polyolefin, e.g., polyethylene, polypropylene, etc., preferably polyethylene homopolymer or copolymer including low density polyethylene, high density polyethylene, homogeneous ethylene/alpha-olefin copolymer, or heterogeneous ethylene/alpha-olefin copolymer. Most preferably, the polyolefin comprises low density polyethylene (LDPE) having a melt flow index ranging from about 4 to 30 g/cc.

The foam sheet may have any desired thickness to suit the particular intended application, preferably ranging, e.g., from about 1 to about 80 millimeters. The foam may have any desired density, ranging, e.g., from about 10 to about 150 kg/m$^3$. The density preferably ranges from about 12–100 kg/m$^3$ and, most preferably, from about 15 to 50 kg/m$^3$. The foam sheet preferably has at least about 90% closed cells.

Any conventional chemical or physical blowing agents may be used. Preferably, the blowing agent is a physical blowing agent such as carbon dioxide, ethane, propane, n-butane, isobutane, pentane, hexane, butadiene, acetone, methylene chloride, any of the chlorofluorocarbons, hydrochlorofluorocarbons, or hydrofluorocarbons, as well as mixtures of the foregoing.

The blowing agent may be mixed with the polyolefin blend in any desired amount to achieve a desired degree of expansion in the resultant foam. Generally, the blowing agent may be added to the polyolefin blend in an amount ranging from about 0.5 to 80 parts by weight, based on 100 parts by weight of the polyolefin blend. More preferably, the blowing agent is present at an amount ranging from 1 to 30 and, most preferably, from 3 to 15 parts per 100 parts by weight of the polyolefin blend.

If desired or necessary, various additives may also be included with the polyolefin blend. For example, it may be desirable to include a nucleating agent (e.g., zinc oxide, zirconium oxide, silica, talc, etc.) and/or an aging modifier (e.g., a fatty acid ester, a fatty acid amide, a hydroxyl amide, etc.). Other additives that may be included if desired are pigments, colorants, fillers, antioxidants, flame retardants, stabilizers, fragrances, odor masking agents, and the like.

Foam in accordance with the present invention is preferably made by an extrusion process as is well known in the art. In such a process, the polyethylene or other polyolefin is added to an extruder, preferably in the form of resin pellets. Any conventional type of extruder may be used, e.g., single screw, double screw, and/or tandem extruders. In the extruder, the resin pellets are melted and mixed. A blowing agent is preferably added to the melted polyolefin via one or more injection ports in the extruder. Any additives that are used may be added to the melted polyolefin blend in the extruder and/or may be added with the resin pellets. The extruder pushes the entire melt mixture (melted polyolefin, blowing agent, and any additives) through a die at the end of the extruder and into a region of reduced temperature and pressure (relative to the temperature and pressure within the extruder). Typically, the region of reduced temperature and pressure is the ambient atmosphere. The sudden reduction in pressure causes the blowing agent to nucleate and expand into a plurality of cells that solidify upon cooling of the polymer mass (due to the reduction in temperature), thereby trapping the blowing agent within the cells.

Referring again to FIG. 1, film 14 includes an upper surface 16 and a lower surface 18, the lower surface 18 being adhered to a surface 20 of foam sheet 12. Film 14 preferably has a thickness ranging from about 1 to about 20 mils; more preferably from about 2 to about 8 mils; and most preferably between about 3 and 6 mils.

In order to provide an increase in the COF of the foam sheet, the film comprises a blend of polyethylene homopolymer or copolymer and a thermoplastic elastomer. The thermoplastic elastomer comprises a copolymer or terpolymer including a styrenic component and a rubbery component, with the rubbery component having at least one carbon-carbon double bond and comprising at least about 70 wt. % of the thermoplastic elastomer. Such an elastomer, when blended with polyethylene, formed into a film 14, and adhered to a polyolefin foam sheet 12 in accordance with the present invention, has been found to result in a composite structure 10 having a COF ranging from about 0.5 to about 2.0. That is, the combined effect of film 14 in adherence with the foam sheet 12 has been found to produce a resultant COF ranging from about 0.5 to about 2.0, as measured at the upper surface 16 of film 14 in accordance with ASTM D1894. Thus, the cushioning effect provided by the foam in combination with the highly elastomeric nature of the film adhered to the foam results in a COF ideally suited for tool box liners, non-skid foams, and packaging applications. A COF greater than 2 would result in a film/foam composite structure having excessive tackiness while a COF less than about 0.5 is generally an insufficient improvement over the COF of PE foam alone, which is about 0.4 or less.

When the present composite structure is to be used as a tool box liner, a non-skid surface for, e.g., aircraft maintenance, or a packaging material, the COF of the structure preferably ranges from about 0.6 to about 1.8, more preferably from about 0.7 to about 1.6, more preferably still from about 0.8 to about 1.5, and most preferably from about 0.85 to about 1.4.

The polyethylene homopolymer or copolymer blended with the elastomer preferably comprises at least one material selected from the group consisting of low density polyethylene, high density polyethylene, homogeneous (i.e., metallocene-catalyzed) ethylene/alpha-olefin copolymer, or heterogeneous (i.e., Ziegler-Natta catalyzed) ethylene/ alpha-olefin copolymer. The polyethylene is blended with the elastomer primarily to serve as a carrier or compatibilizer for the elastomer, which can be difficult to extrude and handle in film form, and in this manner facilitates the production of the composite structure and the adhesion of the film to the foam. This latter aim is achieved most readily when the polymer from which the foam sheet is made is chemically similar or identical to the polyethylene blended with the elastomer. In a preferred embodiment, both the foam sheet and film comprise LDPE.

Preferably, the thermoplastic elastomer is present in the blend at a weight percentage ranging from about 35 to about 85. In general, the amount of elastomer in the blend is preferably as low as possible, as difficulties in the processing and production of the film and composite structure generally increase with increasing amounts of elastomer in the blend. However, an adequate amount of elastomer must be present in the blend to increase in the COF of the composite structure to an extent sufficient to suit the end-use application. Between 35 and 85 wt. % elastomer in the blend generally provides an optimum balance between the foregoing considerations. A more preferred range is 50–80 wt. %.

In general, the greater the content of the rubbery component in the thermoplastic elastomer, the less elastomer is needed in the blend. Accordingly, the rubbery component preferably comprises at least 80 wt. % of the thermoplastic elastomer.

A preferred thermoplastic elastomer comprises a block copolymer or terpolymer, wherein the rubbery component is distributed in the copolymer or terpolymer between styrenic end-blocks. Preferred examples of such block copolymers or terpolymers that are useful in accordance with the present invention include the following: styrene-ethylene-butylene-styrene block copolymer (SEBS), styrene-butadiene-styrene block copolymer (SBS), and styrene-isoprene-styrene block copolymer (SIS).

As an alternative to block copolymers and terpolymers, random copolymers and terpolymers comprising styrene and a rubbery component may be employed, such as polybutadiene/styrene rubber.

It may be possible to employ other elastomers in film 14 such as, e.g., polybutadiene rubber, butyl rubber, polychloroprene rubber, acrylonitrile-butadiene rubber, vinylpyridine rubber, ethylene-propylene rubber, etc., provided that such elastomers can be processed into a film and applied to the surface of a polyolefin foam sheet, and will effectively increase the COF of the resultant composite structure. Thermoplastic elastomers comprising a styrenic component and a rubber component as described above have been found optimally suited to achieve the foregoing objectives in accordance with the present invention.

A preferred elastomer is SIS block copolymer, having styrene end blocks and a rubbery isoprene mid block, particularly an SIS having greater than 80 wt. % isoprene (i.e., the rubbery component). A drawback of such material is that, when blended with LDPE, formed into a film, and adhered to a foam sheet in accordance with the present invention, the surface of the film can be easily scuffed upon contact with an object. While this does not effect the performance of the film/foam composite structure, such scuffing reduces its aesthetic quality.

Scuffing can be overcome by blending two different thermoplastic elastomers, such as a blend of SIS and SEBS. Alternatively, embossing the surface of an SIS-containing film also cures the scuffing problem.

In preferred applications, the composite structure 10 is in the form of a sheet suitable for disposal in a substantially flat configuration as shown in FIG. 1, with the film 14 facing upwards, such that objects can be placed on the film portion of the structure. Such objects include tools, when the composite structure is used as a tool box liner, or shoes when it is used as non-skid foam, e.g., for aircraft maintenance. As such, the coefficient of friction in accordance with the invention is sufficient to reduce the tendency for the objects to move in relation to the structure, as compared with polyolefin foam alone, i.e., without a film to improve the COF.

Figure 2:
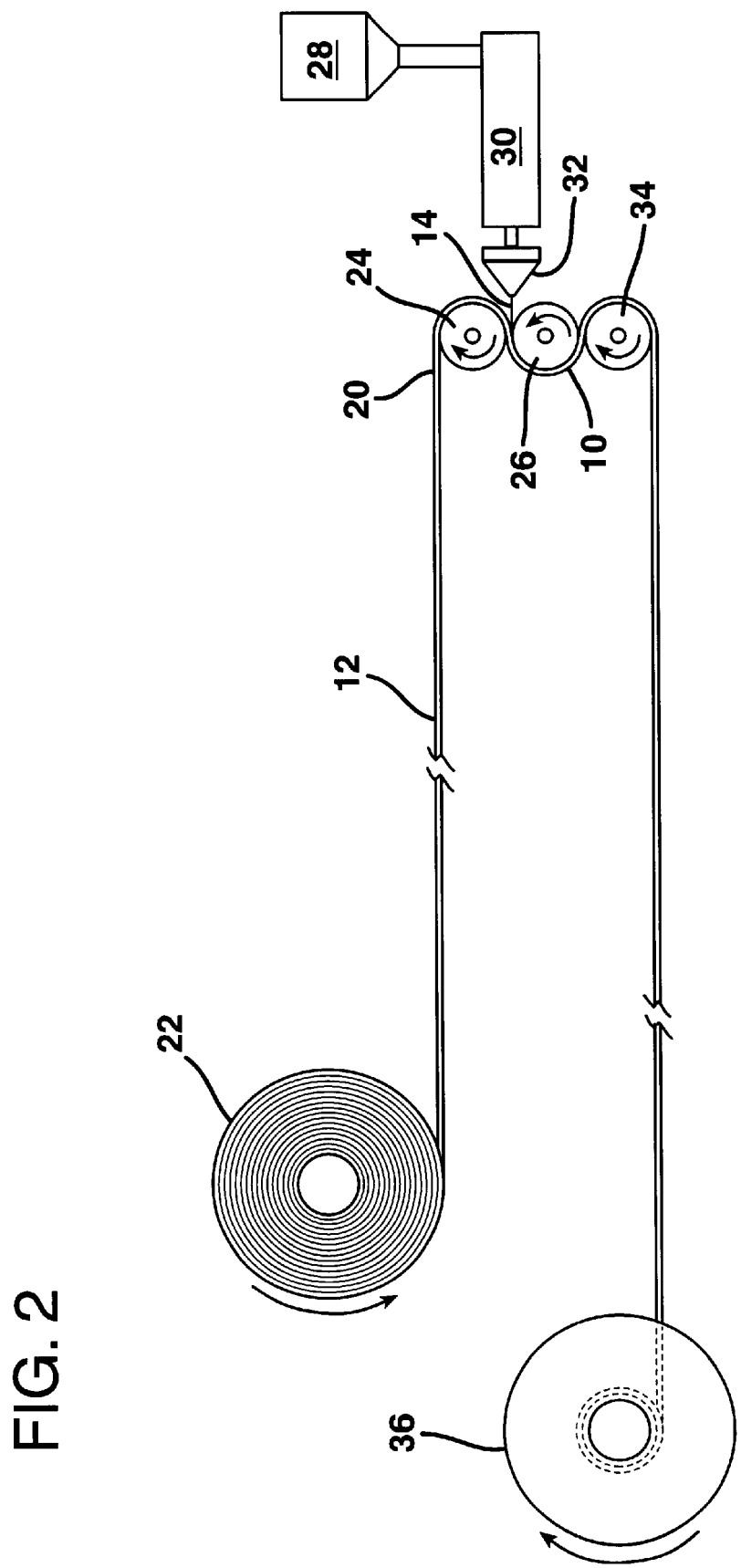
FIG. 2 is a schematic view of a preferred process for making the composite structure shown in FIG. 1.

Having now described the composite structure in accordance with the invention, a preferred method for making the same will be discussed with reference to FIG. 2. Foam sheet 12 is unwound from a storage roll 22 and sent to nip roller 24. Simultaneously, film 14 is extruded onto surface 20 of foam sheet 12 between nip roller 24 and chill roller 26. This is a result of placing resin pellets of the PE and thermoplastic elastomer polymers used to make film 14 into hopper 28, from which they enter extruder 30 wherein the pellets are mixed and melted. The resulting molten polymer blend is extruded into and through flat film die 32 and onto surface 20 of foam sheet 12 as shown. Chill roller 26 is maintained at a sufficiently low temperature, e.g., less than 80° F., such as between 50–80° F., to cause the extruded polymer blend to solidify into film 14 in adherence with foam sheet 12. In addition, nip roller 24 and chill roller 26 are urged against one another, e.g., by mechanical or pneumatic means, with sufficient pressure to facilitate the bonding of the film to the foam by squeezing the film and foam together as they pass between the two rollers. A third roller 34 may also be included to keep the resultant composite structure 10 in contact with chill roller 32 for a full half revolution about the chill roller, and to again apply pressure to the film/foam composite to facilitate bonding of the two materials. The finished composite structure 10 is then wound on storage roll 36.

The foregoing process is known as an extrusion coating process because the film is extruded in a molten state onto a previously formed and solidified foam sheet, whereon the film congeals and solidifies. Such a process is well known and further described, e.g., in U.S. Pat. No. 3,616,020. It is to be understood, however, that a method in accordance with the present invention is not limited to the illustrated extrusion coating process. Many alternatives are possible. For instance, instead of the 'off-line' extrusion coating process illustrated in FIG. 2, wherein a previously made foam sheet is taken from a storage roll, an 'in-line' process may be employed wherein the foam sheet can be extruded from a die and allowed to travel a sufficient distance to solidify before being coated with a film, without the intermediate steps of winding and unwinding the foam on and from a storage roll. As a further alternative, a coextrusion process may be used in which the film and foam are simultaneously extruded from separate dies and brought into contact with one another while both are still in a molten state. The foam and film may also be separately manufactured and then laminated together via any conventional or suitable means, including heat, pressure, adhesives, corona treatment, etc.

These and other aspects and advantages of the invention may be further understood by reference to the following examples, which are provided for illustrative purposes only and are not intended in any way to be limiting.

EXAMPLES

In each of the following examples, foam sheets comprising LDPE having an average thickness of ⅛ inch, width of 48 inches, and density of 3 pounds/cubic foot (pcf) were formed of LDPE in a single-screw extruder using butane as a blowing agent. The extruder had an average output of approximately 260 pounds per hour and included a die with a die gap of 0.03 inch, average die pressure of 3500 psi, and average die temperature of 358° F.

In each of the examples that follow, Sample 1 was a comparative sample having no film adhered to the foam sheet. Each of the other samples were composite structures in accordance with the invention, except as noted below, having a film comprising a blend of LDPE and a thermoplastic elastomer adhered to a surface of the foam. In each case, the film was adhered to the foam by the extrusion coating process described above and illustrated in FIG. 2. The resultant film in adherence with the foam sheets in each of the following examples had an average thickness ranging from about 4 to about 5 mils.

All ratios reported in the tables below are weight ratios unless otherwise specified.

Coefficient of Friction (COF) testing was performed on each sample in accordance with ASTM D1894, except that an aluminum sled pulled at 5 inches/minute across the surface of the sample weighed 155 grams instead of the 200 gram weight as specified in the ASTM test. Each reported COF value is the average kinetic COF obtained from 5 separate measurements on each sample.

Example 1

In Samples 2–7 as summarized below in Table 1, film/foam composite structures were made by extrusion coating a film comprising a blend of LDPE and an elastomer onto the surface of a 3 pcf LDPE foam sheet. Sample 1 is a comparative example including no film (LDPE foam sheet only) while Sample 8 is a comparative example in which the film included elastomer only, i.e., no LDPE blended with the elastomer. In Samples 2–3, the elastomer was Europrene SOL TE 9308 thermoplastic elastomer from EniChem Elastomers Americas, Inc., a styrene-isoprene-styrene (SIS) block copolymer having a 70 wt. % isoprene (rubbery) component and a 30 wt. % styrenic component. In Samples 4–8, the elastomer was Europrene SOL T 190 thermoplastic elastomer from EniChem Elastomers Americas, Inc., a styrene-isoprene-styrene (SIS) block copolymer having a 84 wt. % isoprene (rubbery) component and a 16 wt. % styrenic component.

The COF testing results are summarized below in Table 1:

TABLE 1

| Sample | Rubber/styrene ratio in SIS elastomer | Coefficient of Friction | Comments |
| --- | --- | --- | --- |
| 1. 3 pcf (48 kg/m3) LDPE Foam with no film [Comparative] | — | 0.38 | Slippery surface |
| 2. 3 pcf LDPE foam + film [50/50 blend LDPE/Europrene Sol TE 9308 SIS] | 70/30 | 0.59 | Light tackiness |
| 3. 3 pcf LDPE foam + film [30/70 blend LDPE/Europrene Sol TE 9308 SIS] | 70/30 | 0.85 | Good tackiness but surface inferior to Sol T 190 on appearance and finish. Also, processing more difficult. |
| 4. 3 pcf LDPE foam + film [50/50 LDPE/Europrene Sol T 190 SIS] | 84/16 | 0.88 | Excellent tackiness and ideal for processing. Glossy finish. Surface scuffs upon cooling. |
| 5. 3 pcf LDPE foam + film [50/50 LDPE/Europrene Sol T 190 SIS - Heavily Embossed] | 84/16 | 0.73 | Excellent tackiness with good finish and no scuffing. |
| 6. 3 pcf LDPE foam + film [30/70 LDPE/Europrene Sol T 190 SIS] | 84/16 | 1.14 | Excellent tackiness. |
| 7. 3 pcf LDPE foam + film [25/75 LDPE/Europrene Sol T 190 SIS - Embossed with 40 grit texture] | 84/16 | 1.09 | Excellent tackiness with good finish and no scuffing. |
| 8. 3 pcf LDPE foam + 100% Europrene Sol T 190 film [Comparative] | 84/16 | — | Difficult to process and too tacky to handle. |

As this example demonstrates, e.g., by comparing the COF results of Samples 1 and 2, the addition of a film comprising a SIS elastomer to the surface of LDPE foam greatly increases the COF. The COF and amount of elastomer were both higher in Sample 3. However, as noted in the comments section, processing, i.e., feeding, handling, and extrusion, was more difficult with the higher concentrations of SIS elastomer in the LDPE/SIS blend. In Sample 4, however, a similarly high COF was obtained with only 50% SIS (as opposed to 70% SIS in Sample 3) by using Europrene Sol T 190 having 84% isoprene vs. only 70% isoprene in Sample 3. As noted, Sample 4 processed well, but exhibited some scuffing upon contact with an external object. The scuffing problem was eliminated in Sample 5 by embossing the film surface, albeit at the expense of a decrease in COF.

Sample 6 demonstrates that COF can be further increased by increasing the amount of elastomer in the LDPE/elastomer blend to 70%, again however, with an increase in processing difficulties. Such processing difficulties were overcome by employing a chill roller maintained at 60° F. or lower (see Example 4 below).

Sample 7 demonstrates that the amount of elastomer can be increased from 50% used for Sample 5 to 75% to compensate for the decrease in COF caused by embossing. Despite the higher elastomer content, processing was facilitated by employing a chill roller maintained at 60° F. or lower. This allowed an increased elastomer content, thereby increasing the COF. Sample 7 exhibited excellent tack, an aesthetically pleasing appearance, and no scuffing.

Increasing the elastomer composition beyond 80% resulted in severe processing and handling problems due to extreme tackiness. As shown by comparative Sample 8, for example, in which the film contained no LDPE but pure elastomer only, the molten elastomer was very difficult to extrude and the film was too tacky to handle. This sample thus demonstrates that it is necessary for polyethylene or some other compatibilizer to be blended with the elastomer in order to be able to process composite structures in accordance with the present invention.

Example 2

In Samples 2–3 as summarized below in Table 2, film/foam composite structures were made by extrusion coating a film comprising a blend of LDPE and an elastomer onto the surface of a 3 pcf LDPE foam sheet. Sample 1 is a comparative example including no film (LDPE foam sheet only). In Samples 2–3, the elastomer was KRATON GX 1657 from Shell Chemical Company, a three block copolymer with polystyrene end blocks and a rubbery poly(ethylene-butylene) midblock (S-EB-S), having an 87 wt. % rubbery poly(ethylene-butylene) component and a 13 wt. % styrenic component.

The COF testing results are summarized below in Table 2:

TABLE 2

| Sample | Rubber/styrene ratio in the SEBS elastomer | Coefficient of Friction | Comments |
| --- | --- | --- | --- |
| 1. 3 pcf (48 kg/m3) LDPE Foam with no film layer [Comparative] | — | 0.38 | Slippery surface |
| 2. 3 pcf LDPE foam + film [50/50 LDPE/Kraton G1657 (SEBS)] | 87/13 | 0.60 | Light tackiness |
| 3. 3 pcf LDPE foam + film [40/60 LDPE/Kraton G1657 (SEBS)] | 87/13 | 0.71 | Less tackier than Sol T 190 SIS elastomer. No scuffing |

The SEBS elastomer used in this example provided a COF increase over LDPE foam alone that was comparable with the Sol TE 9308 SIS employed in Example 1. While such increase was not as great as with the higher isoprene-containing SOL T 190, no scuffing was observed with SEBS such that embossing was unnecessary.

Example 3

In Sample 2 as summarized below in Table 3 below, a film/foam composite structure was made by extrusion coating a film comprising a blend of LDPE and an elastomer onto the surface of a 3 pcf LDPE foam sheet. Sample 1 is a comparative example including no film (LDPE foam sheet only). In Sample 2, the elastomer was Europrene SOL TE 6320 thermoplastic elastomer from EniChem Elastomers Americas, Inc., a styrene-butadiene-styrene (SBS) block copolymer having approximately 69–70 wt. % isoprene (rubbery) component and approximately 30–31 wt. % styrenic component. The COF testing results are summarized below in Table 3:

TABLE 3

| Sample | Rubber/styrene ratio in the SBS elastomer | Coefficient of Friction | Comments |
| --- | --- | --- | --- |
| 1. 3 pcf (48 kg/m3) LDPE Foam with no film layer | — | 0.38 | Slippery surface |
| 2. 3 pcf LDPE foam + film [50/50 LDPE/ Europrene Sol TE 6320 SBS)] | 69–70/30–31 | 0.64 | Low tackiness |

The SBS elastomer used in this example provided a COF increase over LDPE foam alone that was comparable with the Sol TE 9308 SIS employed in Example 1.

Example 4

In Samples 2–3 as summarized in Table 4 below, film/foam composite structures were made by extrusion coating a film comprising a blend of LDPE and an elastomer onto the surface of a 3 pcf LDPE foam sheet. Sample 1 is a comparative example including no film (LDPE foam sheet only). In Samples 2–3, the elastomer was a blend of Europrene SOL T 190 SIS elastomer as described above and KRATON GX 1657 SEBS elastomer as also described above. As noted in Table 4, the blend included 40 wt. % LDPE, 30 wt. % SIS, and 30 wt. % SEBS.

The COF testing results are summarized below in Table 4:

TABLE 4

| Sample | LDPE/SIS/ SEBS ratio | Coefficient of Friction | Comments |
| --- | --- | --- | --- |
| 1. 3 pcf (48 kg/m3) LDPE Foam with no film layer | — | 0.38 | Slippery surface |
| 2. 3 pcf LDPE foam with film without embossing at 140° F. chill roller temperature | 40/30/30 | 0.81 | Excellent tackiness with slight scuffing and glossy finish |
| 3. 3 pcf LDPE foam with film without embossing at 60° F. chill roller temperature | 40/30/30 | 1.19 | Excellent tackiness with no scuffing and glossy finish |

As shown, the blend produced excellent tackiness on par with SOL T 190 SIS alone, but with reduced or no scuffing. Surprisingly, by employing a lower nip roll temperature of 60° F. as in Sample 3 vs. a higher nip roll temperature of 140° F. as in Sample 2, increased COF and less tackiness was achieved.

While the invention has been described with reference to illustrative examples, those skilled in the art will understand that various modifications may be made to the invention as described without departing from the scope of the claims which follow.

What is claimed is:

1. A composite structure comprising:
   a. a foam sheet comprising polyolefin; and
   b. a film having a thickness ranging from about 1 to about 20 mils and also having an upper surface and a lower surface in adherence with a surface of said foam sheet, said film comprising a blend of polyethylene homopolymer or copolymer and at least two different thermoplastic elastomers, each of said thermoplastic elastomers comprising a copolymer or terpolymer comprising a styrenic component and a rubbery component, said rubbery component having at least one carbon-carbon double bond and comprising at least about 70 wt. % of said thermoplastic elastomer,
   wherein, said Mm in adherence with said foam sheet results in a coefficient of friction ranging from about 0.5 to about 2.0 as measured at said upper surface of said film.

2. The composite structure of claim 1, wherein said foam sheet comprises polyethylene homopolymer or copolymer.

3. The composite structure of claim 1, wherein said foam sheet has a thickness ranging from about 1 to about 80 millimeters.

4. The composite structure of claim 1, wherein said polyethylene homopolymer or copolymer comprises at least one material selected from the group consisting of low density polyethylene, high density polyethylene, homogeneous ethylene/alpha-olefin copolymer, and heterogeneous ethylene/alpha-olefin copolymer.

5. The composite structure of claim 1, wherein said thermoplastic elastomer is present in said blend at a weight percentage ranging from about 35 to about 85.

6. The composite structure of claim 1, wherein said rubbery component comprises at least 80 wt. % of said thermoplastic elastomer.

7. The composite structure of claim 1, wherein said thermoplastic elastomer comprises a block copolymer or terpolymer and said rubbery component is distributed therein between styrenic end-blocks.

8. The composite structure of claim 7, wherein said thermoplastic elastomer comprises at least one material selected from the group consisting of styrene-ethylene-butylene-styrene block copolymer, styrene-butadiene-styrene block copolymer, and styrene-isoprene-styrene block copolymer.

9. The composite structure of claim 1, wherein said blend of at least two different thermoplastic elastomers comprises styrene-ethylene-butylene-styrene block copolymer and styrene-isoprene-styrene block copolymer.

10. The composite structure of claim 1, wherein said coefficient of friction ranges from about 0.8 to about 1.5.

11. The composite structure of claim 1, wherein said composite structure is in the form of a sheet suitable for disposal in a substantially flat configuration, with said film facing upwards, such that objects can be placed on said structure, said coefficient of friction being such as to reduce the tendency for said objects to move in relation to said structure.

12. A method for making a composite structure, comprising:
  a. providing a foam sheet comprising polyolefin; and
  b. adhering a film having an upper surface and a lower surface to a surface of said foam sheet, said lower surface of said film being in adherence with said foam sheet, said film comprising a blend of polyethylene homopolymer or copolymer and at least two different thermoplastic elastomers, each of said thermoplastic elastomers comprising a copolymer or terpolymer comprising a styrenic component and a rubbery component, said rubbery component having at least one carbon-carbon double bond and comprising at least about 70 wt. % of said thermoplastic elastomer,
    whereby, said film in adherence with said foam sheet results in a coefficient of friction ranging from about 0.5 to about 2.0 as measured at said upper surface of said film.

13. The method of claim 12, wherein said foam sheet comprises polyethylene homopolymer or copolymer.

14. The method of claim 12, wherein said foam sheet has a thickness ranging from about 1 to about 80 millimeters.

15. The method of claim 12, wherein said film has a thickness ranging from about 1 to about 20 mils.

16. The method of claim 12, wherein said polyethylene homopolymer or copolymer comprises at least one material selected from the group consisting of low density polyethylene, high density polyethylene, homogeneous ethylene/alpha-olefin copolymer, or heterogeneous ethylene/alpha-olefin copolymer.

17. The method of claim 12, wherein said thermoplastic elastomer is present in said blend at a weight percentage ranging from about 35 to about 85.

18. The method of claim 12, wherein said rubbery component comprises at least 80 wt. % of said thermoplastic elastomer.

19. The method of claim 12, wherein said thermoplastic elastomer comprises a block copolymer or terpolymer and said rubbery component is distributed therein between styrenic end-blocks.

20. The method of claim 19, wherein said thermoplastic elastomer comprises at least one material selected from the group consisting of styrene-ethylene-butylene-styrene block copolymer, styrene-butadiene-styrene block copolymer, and styrene-isoprene-styrene block copolymer.

21. The method of claim 12, wherein said blend of at least two different thermoplastic elastomers comprises styrene-ethylene-butylene-styrene block copolymer and styrene-isoprene-styrene block copolymer.

22. The method of claim 12, wherein said coefficient of friction ranges from about 0.8 to about 1.5.

23. The method of claim 12, wherein said film is extrusion coated onto said surface of said foam sheet to form said composite structure, said composite structure then being passed between a pair of rollers, at least one of said rollers being maintained at a temperature of less than 80° F.

\* \* \* \* \*